July 14, 1970  E. R. EVANS  3,520,343
SELF-TAPPING LOCKING SCREW
Filed Sept. 18, 1967
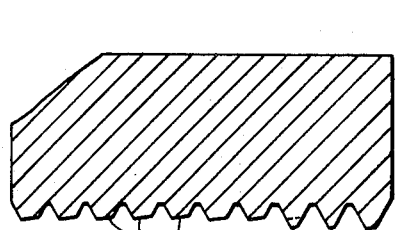
FIG.1
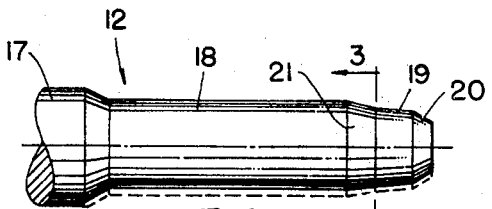
FIG.2
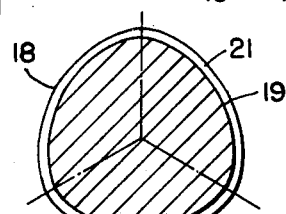
FIG.3
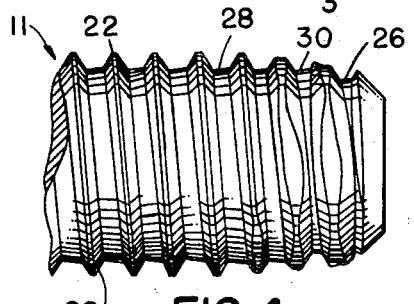
FIG.4
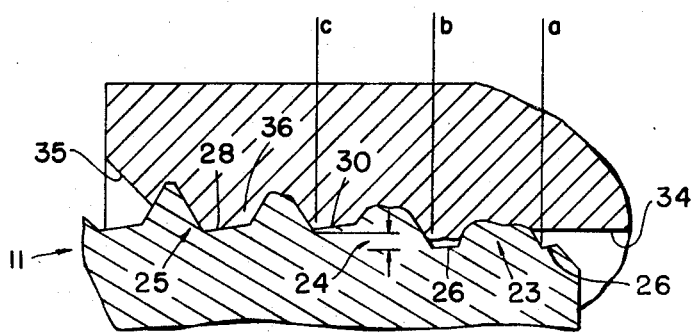
FIG.6
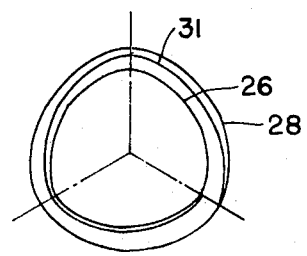
FIG.5
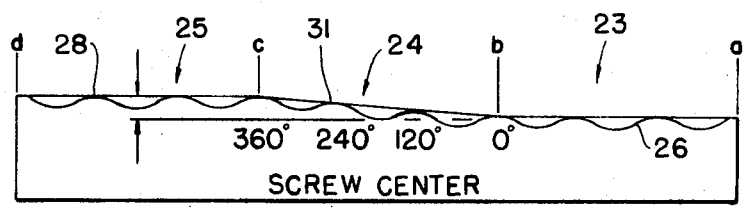
FIG.7
FIG.9  FIG.8
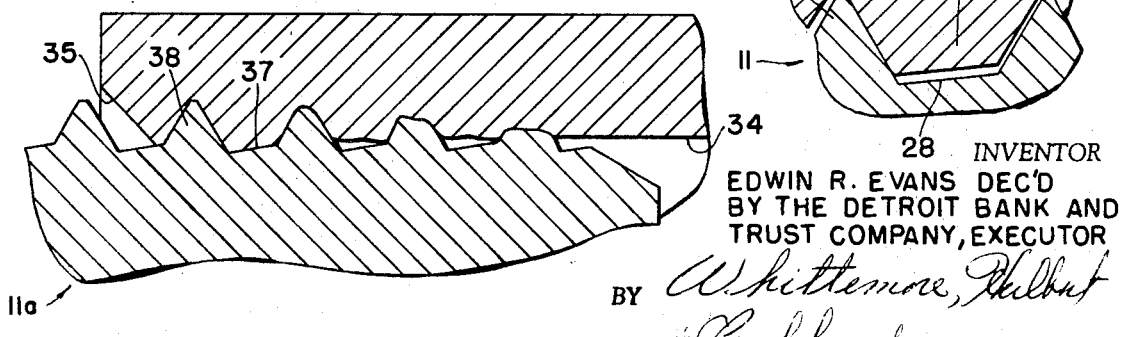
INVENTOR
EDWIN R. EVANS DEC'D
BY THE DETROIT BANK AND
TRUST COMPANY, EXECUTOR
BY Whittemore, Hulbert
& Belknap  ATTORNEYS

United States Patent Office 3,520,343
Patented July 14, 1970

3,520,343
SELF-TAPPING LOCKING SCREW
Edwin R. Evans, deceased, late of Orchard Lake, Mich., by The Detroit Bank and Trust Company, executor, Detroit, Mich., assignor to Lock Thread Corporation, Detroit, Mich., a corporation of Delaware
Continuation-in-part of application Ser. No. 531,653, Feb. 9, 1966, which is a continuation-in-part of application Ser. No. 227,301, Oct. 1, 1962. This application Sept. 18, 1967, Ser. No. 670,016
The portion of the term of the patent subsequent to Sept. 19, 1984, has been disclaimed
Int. Cl. F16b 25/00, 33/02, 39/30
U.S. Cl. 151—22                                 11 Claims

ABSTRACT OF THE DISCLOSURE

The self-tapping screw extrudes the female thread radially inwardly sufficiently to cause the crest of the female thread to impinge upon and interfere with the root of the screw. The root of the self-tapping screw in one or more convolutions is of arcuate non-circular cross section so that the interference is relieved at circumferentially spaced points.

---

This application is a continuation-in-part of our copending application Ser. No. 531,653 filed Feb. 9, 1966, now Pat. No. 3,342,234 which in turn is a continuation-in-part of our copending application Ser. No. 227,301, filed Oct. 1, 1962, now Pat. No. 3,247,877.

The invention relates to self-locking, chipless self-tapping screws having interference with an internal thread tapped by the screw.

BACKGROUND OF THE INVENTION

Heretofore self-tapping screws have not been so designed as to provide interference on the minor diameter, that is between the root of the screw and the crest of the extruded female thread.

SUMMARY OF THE INVENTION

It is an essential object of the invention to provide a self-locking, chipless self-tapping screw so designed as to provide interference on the minor diameter, that is between the root of the screw and the crest of the extruded female thread.

Another object is to provide the self-tapping screw with an arcuate non-circular root in one or more convolutions to provide interference relief at circumferentially spaced points.

Another object is to provide a self-tapping screw having a male thread including a starting portion adjacent one end of the screw, a body portion, and a ramp portion between the starting and body portions, wherein the root of the body portion in at least one convolution adjacent the ramp portion is of arcuate non-circular cross section to provide interference relief at circumferentially spaced points.

Another object is to provide a self-tapping screw as defined in the preceding paragraph, wherein the root of the body portion of the male thread in a plurality of convolutions adjacent the ramp portion is of arcuate non-circular cross section.

Another object is to provide a self-tapping screw wherein the root of the ramp portion is of arcuate non-circular cross section to provide an improved swaging action on the crest of the extruded female thread.

Other objects and features of the invention will become apparent as the description proceeds, especially when taken in conjunction with the accompanying drawings, wherein:

FIG. 1 is a sectional view of a thread rolling die taken perpendicular to the ribs which may be employed with another similar die to form a screw in accordance with the present invention.

FIG. 2 is a side elevational view of a blank from which a screw of this invention may be formed by thread rolling.

FIG. 3 is a sectional view taken on the line 3—3 of FIG. 2.

FIG. 4 is a side elevational view of a screw formed by thread rolling the blank shown in FIG. 2.

FIG. 5 is a diagrammatic view illustrating a portion of the thread root form of the screw shown in FIG. 4.

FIG. 6 is a sectional view of the screw threaded into a drilled hole to extrude the female thread.

FIG. 7 is a linear projection of the root form of the screw shown in FIG. 4.

FIG. 8 is a sectional view showing the interference relief between the crest of the female thread and the root of the screw thread in the body portion thereof.

FIG. 9 is a sectional view, like FIG. 6, of a modified screw threaded into a drilled hole to extrude the female thread.

Referring now more particularly to the drawings, a self-locking, chipless self-tapping screw of this invention is illustrated in FIG. 4 and generally designated 11. This screw may be made by rolling the blank 12 in FIG. 2 between a pair of complementary thread rolling dies, one of which is indicated at 13 in FIG. 1.

The thread rolling die 13 has straight spaced parallel ribs 14, straight spaced parallel ribs 15 which are higher, that is project to a greater extent, than the ribs 14, and the tapered rib 16 constituting a ramp raving a thread height at one end equal to that of the ribs 14 and at the other end a height equal to that of the ribs 15. The die in FIG. 1 is one of a pair. A similarly formed matching die is used in cooperation with die 13 in a thread rolling operation to produce the screw 11 in FIG. 4 from the blank 12 in FIG. 2.

The blank 12 in FIG. 2 has a shank 17 not intended to be threaded, a locking body portion 18, and a starting portion 19. The starting portion 19 is adjacent the entering end of the blank and has a conical or chamfered tip 20. The starting portion 19 is connected to the body portion 18 by a ramp portion 21 which is conical and tapers toward the entering end of the blank. The body portion 18 of the blank is of lobular cylindrical form. In other words, the longitudinal surface elements of the body portion are parallel to the axis of the blank but in cross section the body portion is polygonal or lobular rather than circular. Preferably the lobes of the body portion (that is the points on the surface where the three radiating lines intersect the surface, which points are spaced a maximum distance from the center of the blank) are three in number although other numbers of lobes may be employed. In general, it is preferred that there be an odd number of lobes.

The starting portion 19 is of smaller cross section than the body portion, and is preferably of conical lobular form as shown having the same number of lobes as the body portion. The starting portion tapers toward the entering end of the blank.

The conical chamfered tip 20 and ramp portion 21 are likewise preferably lobular as shown having the same number of lobes as the body and starting portions.

While the body portion 18 is shown as being considerably longer than the starting portion, it will be understood that the starting portion may, if desired, be the longer of the two.

In FIG. 2 the dotted line represents the amount of relief provided between the lobes, that is, the difference between the radius of the blank at the lobes and at points midway between the lobes. The portions 18, 19, 20 and 21 of the blank are substantially symmetrical.

When the blank in FIG. 2 is rolled between a pair of thread dies, one of which is shown in FIG. 1, the screw 11 shown in FIG. 4 is produced. The thread die ribs 14 roll the body portion of the thread on the body portion 18 of the blank, the ribs 15 roll the starting portion of the thread on the starting portion of the thread on the starting portion 19 of the blank, and the rib 16 rolls the ramp portion of the thread on the conical ramp portion 21 of the blank to connect the starting and body portions of the thread on the finished screw.

The thread of the screw in FIG. 4 is a continuous male thread 22 having tapered flanks. The thread as seen in FIGS. 6 and 7 has a starting portion 23 between lines a and b, a ramp portion 24 between lines b and c, and a body portion 25 to the left of line c. The starting portion 23 of the thread will ordinarily constitute one or more convolutions or turns of the thread, the ramp portion 24 will preferably extend from one-third of a convolution to one full convolution and in the present instance is one full convolution, and the body portion 25 will be made up of several convolutions and usually constitutes the major portion of the length of the screw. The entire root is of substantial width measured axially to provide broad load-bearing surfaces.

The root of the starting thread portion is indicated at 26 and may be lobular as shown, that is of arcuate noncircular cross section providing alternate lobes and intermediate sides. FIG. 5 provides an outline of the axial projection of the starting thread root and it will be seen to be of the same general lobular outline as the starting portion 19 of the blank.

The root of the body portion 25 of the thread is shown at 28 and will be seen in axial projection likewise to have the same general lobular outline as the body portion 18 of the blank.

The axial projection of the root 31 of the single convolution constituting the ramp portion of the thread (that is, the portion from numeral 26 to numeral 30 in FIG. 6, and the portion between lines b and c in FIG. 7) also has a lobular configuration similar to that of the ramp portion of the blank. FIG. 5 indicates the form of the ramp root and shows its connection to the body portion and starting portion. The lobes in the ramp portion 24 are located progressively farther outward from the axis of the screw, as seen in FIG. 7. The root portions between the lobes in the ramp portion 24 are radially inwardly relieved relative to the line of taper established by the lobes, as seen between lines b and c in FIG. 7.

FIG. 7 shows clearly the lobular or relieved form of the root between the lines a–b (starting thread), b–c (ramp), and c–d (body portion). The lobes and root portions between the lobes in sections a–b, b–c and c–d merge and blend gradually with one another to provide a smooth gently relieved form free of sharp edges and projections.

The crest of the thread of screw 11 in the body portion of the thread is symmetrical with and has substantially the same lobular form as the root in the body portion, although obviously of larger dimension. The crest of the thread in the body portion is substantially full formed and of uniform height throughout the convolutions thereof.

The crest in the ramp and starting portions of the thread are of the same general form as the root in the ramp and starting portions, except that it tapers from the full thread form of the body portion and diminishes toward the entering end of the screw. The crest in the ramp and starting portions will be lobular and symmetrical with the root in such portions. The conical form of the starting and ramp portions 19 and 21 of the blank 12 produces the spiral taper on the crest adjacent the entering end of the rolled thread.

The screw is shown in FIG. 6 after it has tapped its way into a drilled hole 34. The hole 34 may have a chamfer 35 at the entering end. The diameter of the drilled hole is greater than the smallest diameter of the screw thread crest at the entering end, but less than the maximum diameter of the thread crest. The screw extrudes a female thread 36 as it enters the drilled hole. The female thread 36 gradually builds up and is extruded radially inwardly toward the root of the screw. The relationship between the parts in such that the extruded female part will impinge upon and contact the root of the screw. Desirably, it will impinge upon and contact the ramp portion 24. The lobular ramp portion 24 has a swaging, compacting action upon the extruded female thread. The lobular body portion 25 of the screw root has a continuing swaging and compacting action on the extruded female thread. Thus, the female thread is improved and strengthened by the compacting action of the screw root.

The impingement of the female crest on the lobe or lobes of the root ramp and root body of the screw provides a locking interference resisting withdrawal of the screw. Normally, at least the highest lobe on the root ramp will interfere with the extruded female crest, as well as all of the root lobes in the body portion of the screw. Usually, there is no crest contact on the root of the screw at the low points of the root between lobes, both in the lobular body and ramp portions of the screw. As shown in FIG. 8, there is actually a void or space between the screw root and female crest between lobes. In a broader sense, there may be interference at the points of relief between lobes, but at least this interference will be relieved or lessened due to the lobe form of the screw.

There is preferably no interference between the female crest and the root of the screw in the starting portion 23. Therefore the starting root portion might, without disadvantage, be round rather than lobular.

As thus seen, the crest of the entering male thread is tapered so that the displacing or extruding action is gradual. The hole diameter is dimensioned with reference to the screw so that enough material will be displaced toward the screw root to produce interference in the body portion and preferably also on at least the first lobe of the root portion of the screw.

The swaging action of the screw root on the female crest not only produces the desired interference, but also compacts the displaced metal into a hardened, stronger, smoothly burnished, internal thread.

It will be noted that the male root is inclined axially toward the longitudinal center of the screw in a direction away from the entering end at an angle of not more than 15° and preferably on the order of about 6°. The broad inclined root (1) contacts the newly formed female thread and helps to guide the entry of the screw so that it cannot to be turned in off line (2) acts as a wedge to promote locking against the newly formed female crest when a working load is applied to the screw, and (3) also increases the pull-out strength of the screw because of the action of combined forces of shear and compressive presstress upon the inclined root of the screw. Application of torque-tension on the screw increases pressure on the engaged flanks at the lobes of the mating threads. Metal should be displaced from the flank of the newly formed internal thread. Some will escape into the voids on either side of the high lobes but some will be confined under even higher compression by the inclined locking root, increasing the locking action of the screw over that normally expected.

FIG. 9 shows a modified screw 11a shown turned into the drilled hole 34. This screw 11a differs from the screw 11 only in that the root 37 of the thread 38 is of the same size and lobular form throughout the body, ramp and starting portions, rather than having a stepped or reduced form at the starting end. The entire root form of the screw 11a may thus be the same as the root in the body portion 25 of screw 11.

When the screw 11a is turned into the drilled hole, the displaced metal from the wall of the drilled hole is gradually extruded into impingement with the screw root so that after the first few turns the female crest is compacted by and has interfering contact with the lobes of the screw root. The screw root between the interfering lobes will usually be out of contact with the extruded crest, as shown in FIG. 8. In a broader sense there may actually be interfering contact on the screw root between lobes, although, of course, such interference will be reduced or lessened because of the lobe form.

The relieved interference due to the lobular form of the screw root reduces the assembly drag torque, although it produces enough holding action to securely lock the screw in place. Moreover, the lobe form of the screw root permits a wider range of tolerances on the mating parts than would be the case if the root were round and the interference continuous, rather than relieved.

The screw 11 has the advantage of a swaging root ramp portion over the screw 11a. The root ramp of the screw 11 which, as noted, is preferably lobular in form is intended to have an initial compacting action upon the displaced metal of the female crest to harden and strengthen the same.

FIG. 8 shows a space between the leading flank of the screw 11 (or 11a) and the confronting flank of the female thread. This flank clearance exists only at the low points of the screw root between lobes. There is no flank clearance at the lobes of the screw root.

What is claimed as the invention is:

1. A self-tapping locking screw having a continuous external generally helical male thread, a female member having a continuous internal female thread mating with said male thread, said female thread being tapped by said screw and progressively radially inwardly extruded by said male thread during insertion of said screw, the crest of said male thread tapering radially inwardly adjacent the entering end of said screw in a direction toward said entering end, the root of said screw in at least one convolution being of arcuate non-circular cross section having a plurality of convex arcuately curved lobes and intermediate sides, said lobes being located farther outward from the axial center of said screw than said sides, said lobes and sides merging and blending gradually with one another to provide a substantially smooth, gently relieved form free of sharp edges and projections, the crest of said female thread extending generally helically and being extruded radially inwardly sufficient to impinge upon and have interference with at least some of said lobes, the root of said male thread being of substantial width measured axially to provide broad load-bearing surfaces.

2. The structure defined in claim 1, wherein said crest of said female thread is radially spaced from the sides adjacent said interfering lobes.

3. A self-tapping locking screw having a continuous external generally helical male thread including a starting portion adjacent the entering end of said screw, a body portion, and a ramp portion between said starting and body portions, said thread continuing throughout each of said portions, a female member having a continuous internal female thread mating with said male thread, said female thread being tapped by said screw and progressively radially inwardly extruded by said male thread during insertion of said screw, the crest of said male thread tapering radially inwardly adjacent said entering end of said screw in a direction toward said entering end, the root of said starting portion being of reduced cross section relative to the root of said body portion, the root of said starting portion being angularly related to the root of said ramp portion, the root of said body portion in at least one convolution adjacent said ramp portion being of arcuate non-circular cross section having a plurality of convex arcuately curved lobes and intermediate sides, said lobes being located farther outward from the axial center of said screw than said sides, said lobes and sides merging and blending gradually with one another to provide a substantially smooth, gently relieved form free of sharp edges and projections, the root of said ramp portion connecting the roots of said body portion and starting portion and providing a generally radially outward taper from said starting portion to said body portion, the root of said ramp portion being of arcuate non-circular cross section, said root of said ramp portion having a lobe adjacent the root of said body portion located farther outward from the axial center of said screw than the root surfaces on either side thereof and merging and blending gradually with the latter to provide a smooth, gently relieved form free of sharp edges and projections, the crest of said female thread extending generally helically and being spaced from the root of said screw in said starting portion thereof and extruded radially inwardly sufficiently to impinge upon and have interference with at least some of said lobes, said interference being relieved between said interfering lobes, the root of said male thread being of substantial width measured axially to provide broad load-bearing surfaces.

4. The structure defined in claim 3, wherein said crest of said female thread is radially spaced from the sides adjacent said interfering lobes.

5. A self-tapping locking screw having a continuous external generally helical male thread including a starting portion adjacent the entering end of said screw, a body portion and a ramp portion between said starting and body portions, said thread continuing throughout each of said portions, a female member having a continuous internal female thread mating with said male thread, said female thread being tapped by said screw and progressively radially inwardly extruded by said male thread during insertion of said screw, the crest of said male thread tapering radially inwardly adjacent said entering end of said screw in a direction toward said entering end, the root of said starting portion being of reduced cross section relative to the root of said body portion, the root of said starting portion being angularly related to the root of said ramp portion, the root of said body portion in each of a plurality of convolutions adjacent said ramp portion being of arcuate non-circular cross section having a plurality of convex arcuately curved lobes and intermediate sides, in each of said plurality of convolutions said lobes being located farther outwardly from the axial center of said screw than said sides, said lobes and sides merging and blending gradually with one another to provide a substantially smooth gently relieved form free of sharp edges and projections, the root of said ramp portion connecting the roots of said body portion and starting portion, said root of said ramp portion being of arcuate non-circular cross section having a plurality of convex arcuately curved lobes and intermediate sides, said second-mentioned lobes being located progressively farther outward from the axial center of said screw from said starting portion to said body portion to provide said root of said ramp portion with a generally radially outward taper from said starting portion to said body portion, said second-mentioned intermediate sides being radially inwardly relieved relative to the line of taper provided by said second-mentioned lobes, said second-mentioned lobes and sides merging and blending gradually with one another to provide a substantially smooth, gently relieved form free of sharp edges and projections, the crest of said female thread extending generally helically and being spaced from the root of said screw in said starting portion thereof and being extruded radially inwardly sufficiently to impinge upon and have interference with at least some of said lobes but being spaced from sides adjacent the interfering lobes, said radially outermost lobe in said ramp portion being located substantially no farther outward from the axial center of said screw than said first-mentioned lobes, the root of said male thread being of substantial width measured axially to provide broad load-bearing surfaces.

6. The structure defined in claim 5, wherein the root of said body portion in said plurality of convolutions, the root of said ramp portion, and the root of said starting portion are of arcuate triangular cross section and are substantially symmetrical with one another.

7. The structure defined in claim 5, wherein said load-bearing root surfaces of said screw diverge from its axis in a direction away from the direction of load at an angle of approximately 6° so that said load-bearing root surfaces are axial load bearing.

8. The structure defined in claim 1, wherein the root of said male thread is of substantially the same size and lobular form throughout its length.

9. The structure defined in claim 3, wherein the load-bearing root surfaces of said male thread diverge from the axis of said male member in a direction away from the direction of load, the angle of divergence not exceeding approximately 15°.

10. A self-tapping locking screw having an external generally helical male thread, a female member having a continuous internal female thread mating with said male thread, said female thread being tapped by said screw and progressively radially inwardly extruded by said male thread during insertion of said screw, the crest of said male thread tapering radially inwardly adjacent the entering end of said screw in a direction toward said entering end, the crest of said female thread extending generally helically and being extruded radially inwardly sufficiently to impinge upon and have interference with the root of said male thread, said root of said male thread being of substantial width measured axially to provide broad load-bearing surfaces, said root of said male thread being radially relieved at least adjacent the entering end of said screw at circumferentially spaced points to provide interference relief at said circumferentially spaced points.

11. The combination defined in claim 10, wherein said root of said male thread diverges from the axis of said screw at an angle not exceeding approximately fifteen degrees.

References Cited
UNITED STATES PATENTS

| | | | |
|---|---|---|---|
| Re.24,572 | 12/1958 | Welles | 10—152 |
| 1,827,615 | 10/1931 | Rosenberg | 85—41 |
| 2,113,600 | 4/1938 | Olson | 85—47 |
| 2,437,638 | 3/1948 | Evans | 151—22 |
| 2,873,641 | 2/1959 | Evans | 151—22 |
| 3,246,556 | 4/1966 | Phipard | 85—46 |
| 3,247,877 | 4/1966 | Evans | 151—22 |
| 3,249,142 | 5/1966 | Phipard | 151—22 |
| 3,342,234 | 9/1967 | Evans | 151—22 |

RAMON S. BRITTS, Primary Examiner

U.S. Cl. X.R.

85—46